United States Patent [19]

Robertson

[11] Patent Number: 4,960,039
[45] Date of Patent: Oct. 2, 1990

[54] CYLINDER WITH SLEEVE COMPACTER SEALS FOR HIGH PRESSURE PUMPS

[75] Inventor: Jason L. Robertson, Edinboro, Pa.

[73] Assignee: Hydro-Pac, Inc., Fairview, Pa.

[21] Appl. No.: 323,502

[22] Filed: Mar. 14, 1989

[51] Int. Cl.⁵ .............................................. F16J 15/18
[52] U.S. Cl. ................................... 92/165 R; 92/168;
92/171.1; 277/58; 277/70; 277/73; 277/102;
277/103; 417/569
[58] Field of Search ................ 92/165, 168, 171, 247;
277/58, 61, 70, 73, 102, 103, 115; 417/569, 570

[56] References Cited

U.S. PATENT DOCUMENTS

| | | | |
|---|---|---|---|
| 1,974,362 | 9/1934 | Marsh | 92/247 X |
| 2,312,430 | 2/1943 | Magnuson | 92/171.1 X |
| 2,518,097 | 8/1950 | Thornhill | 92/168 X |
| 2,701,743 | 2/1955 | Mattingly et al. | 92/171.1 |
| 2,730,957 | 1/1956 | Reide | 417/569 |
| 2,732,809 | 1/1956 | Mattingly et al. | 92/171.1 |
| 2,796,769 | 6/1957 | Gratzmuller | 417/569 X |
| 2,836,443 | 5/1958 | Farmer | 92/168 X |
| 3,902,404 | 9/1975 | Breit | 92/165 R X |
| 3,916,771 | 11/1975 | Nendzig et al. | 92/165 R X |
| 3,940,151 | 2/1976 | Phillips | 92/165 R X |
| 4,775,303 | 10/1988 | Liska | 92/168 X |

FOREIGN PATENT DOCUMENTS

| | | | |
|---|---|---|---|
| 0929569 | 6/1963 | United Kingdom | 277/103 |
| 1410225 | 8/1965 | France | 277/103 |

*Primary Examiner*—Edward K. Look
*Assistant Examiner*—John E. Ryznic
*Attorney, Agent, or Firm*—Buchanan Ingersoll; Lynn J. Alstadt

[57] ABSTRACT

An improved cylinder for pumps of the type where a plunger moves within a cylinder forcing fluid through a port in a cap fitted into one end of the cylinder. A multiple diameter cap encircled by a multiple diameter sleeve transmits the pressure force acting on the largest surface area of the cap through the sleeve to a smaller area acting on the packing seal. Since the pressure multiplied by the area is a constant, a higher pressure is applied to a smaller area at the seals; and with a higher pressure acting on the seals than existing in the working fluid, a seal is created to prevent passage of the fluid.

18 Claims, 2 Drawing Sheets

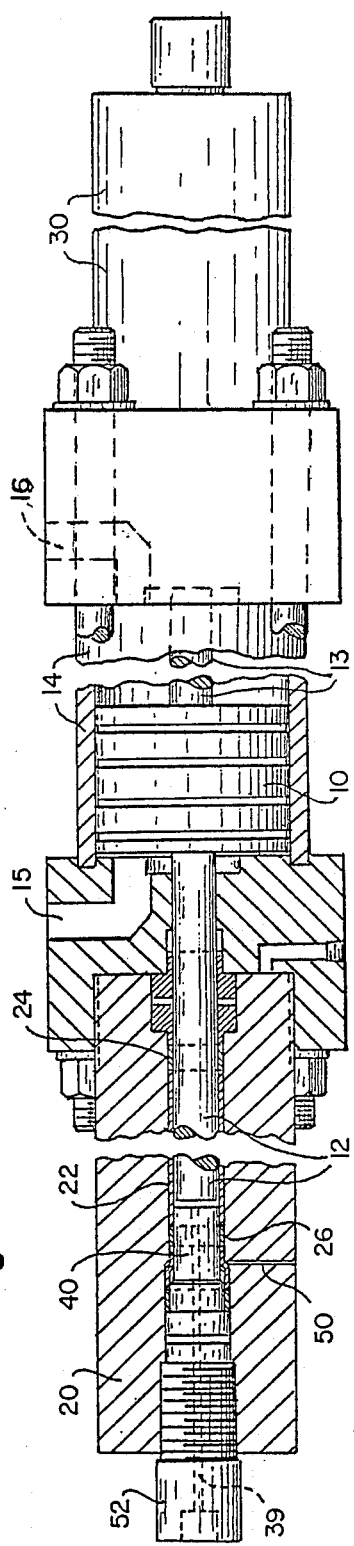
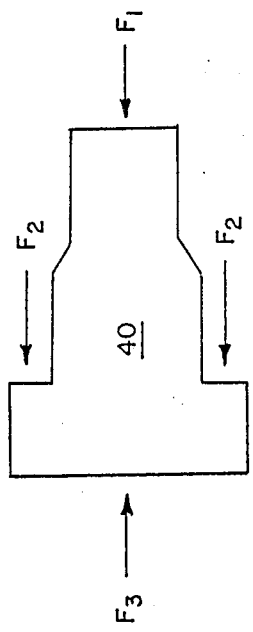
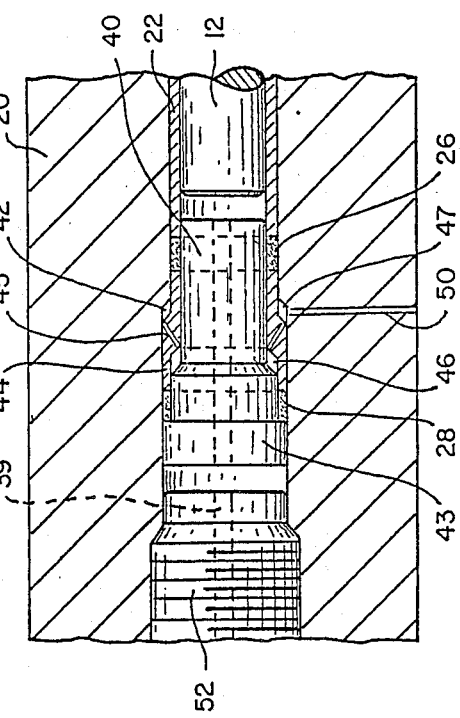
Fig. 1.
Fig. 4.
Fig. 2.

CYLINDER WITH SLEEVE COMPACTER SEALS FOR HIGH PRESSURE PUMPS

BACKGROUND OF THE INVENTION

1. Field of the Invention

The present invention relates to high pressure pumps which operate above 10,000 p.s.i. of the type having a reciprocating plunger or shaft portion.

2. Description of the Prior Art

Pumps for pumping liquids and gases under high pressures typically have one or more cylinders, each cylinder having a reciprocating piston or plunger within. Usually a piston refers to a body which moves within a cylinder having seals or rings which are attached to and travel with the piston. A plunger usually moves relative to a seal attached to a cylinder. Normally a closure having a port therethrough is attached to the distal end of the cylinder. Leakage of fluid around the piston or plunger can typically be prevented by various seals and packings. The seals range from simple O-rings to multiple rings of various materials such as elastomers, polymers, rubber, reinforced combinations thereof, brass and teflon. Such a complex seal is disclosed, for example, in U.S. Pat. No. 2,991,003 to R. S. Peterson.

Very often seals are positioned between the moving plunger and the cylinder wall. Consequently, there is relative movement between the seal and the plunger. The art has recognized that if known types of plunger sealing rings are constructed of a soft enough material to provide an effective seal, the seals rapidly become worn and lose their efficiency. On the other hand, if the seals are constructed of a relatively hard material to withstand wear they generally do not provide a good seal. In addition, hard seals may cause scratching or galling of the surfaces which slide past the seal. As the pressure of the pumped fluid is increased the problem of seals is magnified. As a result, in many pumps the pressure is limited by the effectiveness of the seals.

The art has attempted to reduce the wearing and galling problems associated with harder seals by increasing the hardness of the cylinder or plunger surfaces. This can be done by various surface hardening treatments, coating the wall with carbide or using higher strength alloys. All of these techniques increase the cost of the pump and make manufacturing more difficult. Carbide coatings are also brittle and are intolerant of high tensile stress. Furthermore, in some pumps the corrosiveness of the working fluid may limit the choice of alloys. Consequently, there is a need for a relatively low cost sealing system for high pressure pumps particularly for those pumps which operate at pressures above 10,000 p.s.i. There is also a need for a sealing system which is not dependent upon the metals chosen for the cylinder.

Professor Bridgeman in his book *The Physics of High Pressure*, McMillan Publishing Company, N.Y., 1931, proposed a seal which relied upon a principle of unsupported area sometimes called Bridgeman's principle. Bridgeman states that in order to effect a seal, the hydrostatic pressure in the packing must be maintained at a pressure higher than pressure to be sealed. Prior to the present invention, the art has made only limited application of Bridgeman's principle to piston designs particularly high pressure pumps. For example, in U.S. Pat. No. 4,382,750 to Robertson et al. a free piston compressor for gases and liquids is disclosed in which the positive pressure of the incoming fluid holds a free piston against the piston rod during the intake stroke. Leakage of hydraulic fluid around the piston is prevented by a packing and associated bushing. Although the operation of this bushing and packing are not explained in the specification, one can see from the drawings that Bridgeman's principle is applicable to this system.

The art has commonly relied upon mechanically loaded packings, such as Amagat's fully enclosed packing for high pressure pumps. In a mechanically loaded design, the axial load is supplied by a preloaded gland or flange and is not increased by increasing operating pressure. Under such conditions, the packing wears at much the same rate at low pressure as it does under high pressure. This occurs because the packing pressure does not depend upon the operating pressure. Likewise, operating pressure is limited to something less than the preload pressure of the packing. Consequently, operations at high pressure, 60,000 p.s.i. for example, in systems that have mechanically loaded seals require seals having tremendous preloads. For that reason, there is need for a high pressure pump which does not require a highly preloaded packing and which can operate at pressures of 60,000 p.s.i. and higher.

SUMMARY OF THE INVENTION

I provide a cylinder having an arrangement of seals for a high pressure pump which is not limited by the strengths of the material under load. My seal will work up to the point of failure of the boundary components, the high pressure cylinder, bushing, sleeve, cap or spacer whichever fails first. My cylinders are usable in a variety of applications such as, but not limited to liquid pumps, gas compressors, and apparatus having reciprocating or rotary shaft seals as well as those having stationary shaft seals. My system may be used in conjunction with any shaft seal or packing configuration which requires actual loading to be effective. Consequently, one can use flat washers, tapered washers or any combination of these.

My seals are adapted for a system having a plunger which moves within a cylinder having at one end a cap with a central port through which fluid may be pumped at high pressure. I prefer to provide a sleeve surrounding the outer circumference of the plunger. The sleeve extends the length of the cylinder so that one end of the sleeve will overlap the cap at one end of the cylinder and the second end of the sleeve will always overlap the plunger throughout its stroke. I prefer to provide a first seal at the plunger end of the sleeve and a second seal at the cap end of the sleeve. These seals are rings which surround either the piston or the cap. Beyond the cap seal I provide a vented channel between the cylinder wall and the cap. In the channel I provide a spacer which surrounds the cap and is sized to create a first cavity between the cap and the spacer and a second cavity and between the spacer and the cylinder wall. I provide a vent through the spacer which connects the two cavities and a second vent through the cylinder wall which vents the second cavity to atmosphere. This venting provides the unsupported area for the seal. Finally, I provide a third seal on the other end of the spacer between the cap and the cylinder wall. In the preferred embodiment, the seals, spacer, cap, cylinder and sleeve are all sized to utilize Bridgeman's principle and provide effective seals for high pressure systems.

Other objects and advantages of the invention will become apparent as a description of the drawings and preferred embodiments thereof proceeds.

BRIEF DESCRIPTION OF THE DRAWINGS

FIG. 1 is a side view partially in section of a hydraulic pump cylinder which utilizes my seals;

FIG. 2 is an enlarged view, partially in section, of a portion of the embodiment of FIG. 1;

FIG. 4 is a diagram showing the forces acting on the cap of the hydraulic pump cylinder of FIG. 1;

DESCRIPTION OF THE PREFERRED EMBODIMENTS

Figure 3:
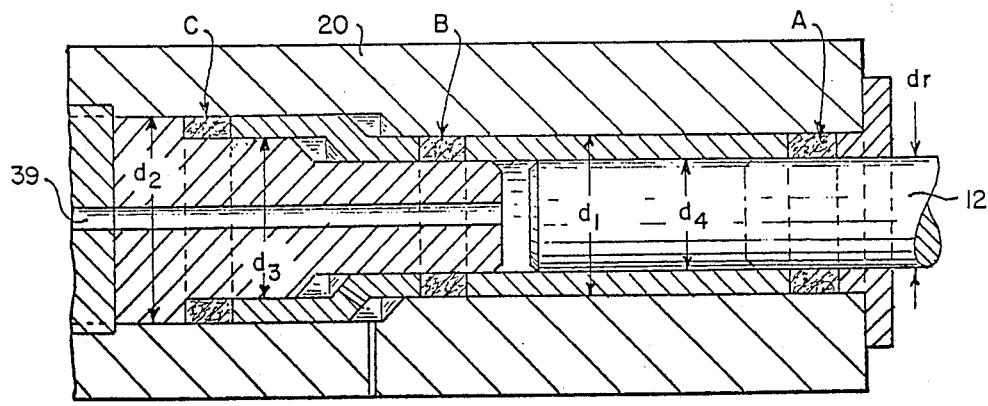
FIG. 3 is another enlarged view, partially in section, of a portion of the embodiment of FIG. 1 and in which certain pertinent diameters are labeled.

Referring to FIG. 1, I provide a reciprocating piston 10 having plungers 12 and 13 attached on opposite sides. Piston 10 reciprocates in cylinder 14. Movement of the piston within cylinder 14 is accomplished by fluid which flows through orifice 15 or orifice 16 depending upon the direction of movement. Plungers 12 and 13 are attached to piston 10 and move within cylinders 20 and 30. Appropriate valves and other fittings (not shown) may be connected to the distal end of each cylinder 20 and 30. Cylinders 20 and 30 are mere images of one another. Consequently, only cylinder 20 need be described. Within cylinder 20 I provide a sleeve 22 which surrounds plunger 12. Sleeve 22 is sized so that when plunger 12 is in its retracted or right most position sleeve 22 will extend past the end of the plunger. Sleeve 22 is also sized to overlap a cap 40 having an outlet port 39. At one end of sleeve 22 I provide a first seal 24. A second seal 26 is provided at the opposite end of sleeve 22 and surrounding cap 40. Within cylinder wall 20 and adjacent to cap 40, I provide a channel 42. I prefer to construct cap 40 so as to have an enlarged portion which extends into channel 42 and a collar 43 at one end. The collar 43 is sized so as to close the channel 42 radially between the cap and the cylinder wall. Within the channel 42 I prefer to provide a spacer 44 which is sized so as to define a first cavity 46 between the cap and the spacer and a second cavity 47 between the spacer and the cylinder wall. Within the spacer 44 I provide at least one vent 45 which permits fluid to flow between the two cavities. I also provide a vent 50 through the cylinder wall which vents the cavity to atmosphere. This venting arrangement creates a system whereby the first cavity 46 between the cap 40 and the spacer 44 and the second cavity 47 between the spacer 44 and cylinder wall will always be at atmospheric pressure. The length of the channel 42 as well as the size of the first and second cavities 46 and 47 are not important as long as they allow axial freedom of movement of the spacer 44 with respect to the cylinder and the cap with respect to the spacer within the channel 42. I further prefer to provide a third seal 28 between the cap and the cylinder wall. This seal 28 and the second seal 26 are positioned so as to be at opposite ends of the spacer 44. The seals can be made from a variety of thermoplastic and elastomeric materials. The choice of materials will depend upon compatibility of the material with the working fluid. The seals may also be comprised of one or more rings or washers of the same or different materials. A plug or closure 52 at the distal end of the cylinder 20 with fluid passageway for the inlet and pumped fluid, completes the assembly.

To understand the operation of my seals one must consider the pressure which acts on each seal. These pressures are related to the surface area of each seal which in turn is a function of the diameters of the cylinder, plunger sleeve and cap.

In FIG. 3, I provide a diagram of the embodiment of FIG. 1 with the components and pertinent diameters labeled. In the drawing $d_1$ is the smallest inside diameter of the cylinder, $d_2$ is the largest diameter of the cap, $d_3$ is the diameter of the middle section of the cap, $d_4$ is the smallest diameter of the cap, $d_r$ is the diameter of the plunger 12.

In general $d_r = d_4$.

The first, second and third seals 24, 26 and 28 are labeled in FIG. 3 with the designations A, B and C, respectively. In this system the pressures acting on the seals A, B and C can be expressed as $P_A$, $P_B$ and $P_C$, respectively. Let $P_i$ be the operating pressure of the pump. It is convenient to define the packing pressure ratios:

$$R_A = \frac{P_A}{P_i}$$

$$R_B = \frac{P_B}{P_i}$$

$$R_C = \frac{P_C}{P_i}$$

Referring to the free body diagram of the cap shown as FIG. 4, the process pressure $P_i$ acting on the area of a cap of diameter $d_2$, is counterbalanced by two forces. The first force $F_1$ is that of process pressure acting on the area of diameter $d_4$. The second force $F_2$ is supplied at C by the pressure of a deformable seal acting on the difference in area of diameters $d_2$ and $d_4$. Since $d_2$ is greater than $d_3$ and $d_3$ is greater than $d_4$, the pressure in the seal at C, $P_c$, must be greater than the process pressure $P_c$.

This second force $F_2$ is transmitted axially through the spacer to the packing at B. Diameter $d_1$ is selected such that the packing pressure at B, $P_b$, which is a result of this transmitted force, is always proportionally greater than the working pressure $P_i$.

The second force $F_2$ at B is also transmitted axially through the sleeve to the rod seal at A. If $d_4 = d_r$ then $P_A = P_B$; and the rod seal pressure ($P_A$) is also greater than the process pressure, $P_i$ and $R_A = R_B$. This neglects the effects of friction which I have found, by experiment, to be insignificant.

The pressures and forces just discussed can be derived from the following calculations. A diagram of the forces acting on the cap is shown in FIG. 4. From the force balance on the cap, $$F_1 = \frac{\pi}{4} P_i d_4^2$$

$$F_2 = \frac{\pi}{4} (d_2^2 - d_3^2) P_c$$

-continued $$F_3 = \frac{\pi}{4} P_i d_2^2$$

$$F_1 + F_2 = F_3$$

or $$\frac{\pi}{4} P_i d_4^2 + \frac{\pi}{4} (d_2^2 - d_3^2) P_c = \frac{\pi}{4} P_i d_2^2$$

or $$F_2 = \frac{\pi}{4} P_c(d_2^2 - d_3^2) = \frac{\pi}{4} P_i(d_2^2 - d_4^2) =$$

$$\frac{\pi}{4} P_B(d_1^2 - d_4^2) = \frac{\pi}{4} P_A(d_1^2 - d_4^2) \text{ and}$$

$$P_c(d_2^2 - d_3^2) = P_i(d_2^2 - d_4^2) = P_B(d_1^2 - d_4^2) = P_A(d_1^2 - d_4^2)$$

$$\frac{P_c}{P_i} = \frac{d_2^2 - d_4^2}{d_2^2 - d_3^2} = \frac{d_2^2 - d_r^2}{d_2^2 - d_3^2} \text{ if } d_r = d_4$$

And $\frac{P_c}{P_i} = R_c > 1$ because $d_3 > d_r = d_4$

If for instance $R_c = R_B = R_A$ $$\frac{d_2^2 - d_r^2}{d_2^2 - d_3^2} = \frac{d_2^2 - d_r^2}{d_1^2 - d_r^2} \text{ or } d_2^2 - d_3^2 = d_1^2 - d_r^2$$

Which allows the selection of diameters.

The separation of pressure between seals B and C and axial freedom of movement between the cap, spacer, sleeve and cylinder must be maintained. Separation of pressure is achieved by porting the annular space between the cap and the spacer and between the spacer and pump cylinder through the spacer and pump cylinder. This prevents pressure build-up in these annuli that would prevent pressure activation of these seals.

These annuli also allow relative axial movement between the cap, spacer and pump cylinder to compensate for packing wear and elasticity.

In my system I have a pressure energized rod seal. The pressure in the packing is always greater than the working pressure. Diameters $d_1$, $d_2$, $d_3$ and $d_4$ can be chosen to give any seal pressure ratio desired. My seal is suitable for reciprocating applications or rotating applications or both. In my system packing pressure varies in proportion to applied pressure and is always greater than the working pressure. Because it is pressure activated, the seal is suitable for extremely high pressures. The packing may be preloaded by suitably placed springs for enhanced operation at low pressures, however, other seals may be more economical for pumps operating at pressures below 3,000 to 5,000 p.s.i.

Figure 5:
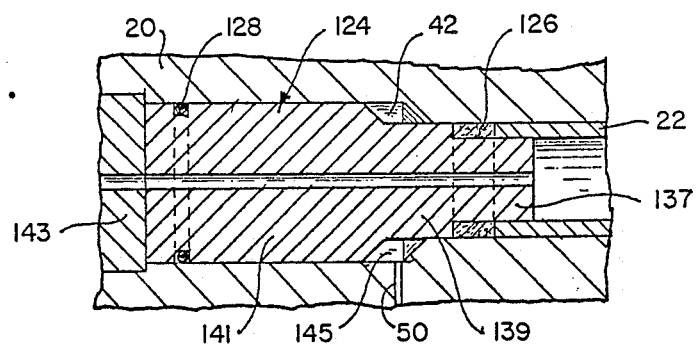
FIG. 5 is a fragmentary view of a hydraulic pump cylinder similar to that shown in FIG. 1, but having a second preferred seal arrangement.
Figure 6:
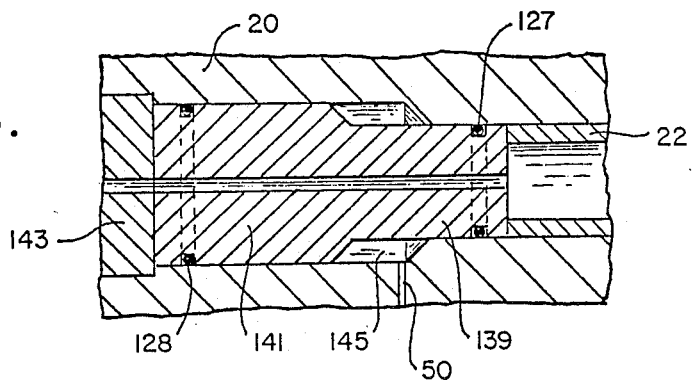
FIG. 6 is a fragmentary view similar to FIG. 5, but having a third preferred seal arrangement.

In FIGS. 5 and 6 I have shown other present preferred embodiments of my cylinder which do not use a spacer. The pump cylinder of these embodiments is generally the same as that shown in FIG. 1. However, the cap and adjacent seals are modified as shown in these figures. Despite these differences, the same principles of operation apply to all embodiments.

In the embodiment of FIG. 5 I provide a cylinder 20 and sleeve 22 as in the previous embodiment. At the end of the sleeve 22 which is adjacent the cap 124 I provide a seal 126. Cylinder 20 has a channel 42. Cap 124 is sized to have a base 143, a body portion 141 which fits into channel 42, a shoulder 139 which fits into the main bore of cylinder 20 and a head 137 which fits into sleeve 22. Another seal 128 is provided between cylinder 20 and the body 141 of cap 142. Cap 124 is positioned in cylinder 20 to define a cavity 145. This cavity is vented by vent 50.

A somewhat different cap is used in the embodiment of FIG. 6. This cap has a base 143, a body 141 and a shoulder 139 which abuts sleeve 22. A first seal 127 is provided between the shoulder 139 and the cylinder 20. A second seal 128 is provided between the cylinder 20 and body 141 of the cap.

In my system loading of the packing is independent of the packing volume because the packing pressure is maintained and automatically adjusts for wear.

The packing set may include metallic anti-extrusion rings in addition to the polymer rings. Also, the rings may be of non-rectangular cross section (tapered, diamond shaped, etc.).

Packing wear is minimized because the packing pressure is not constant. Instead, the packing pressure is proportional to the working pressure and is only enough to effect the seal. This is superior to a preloaded packing design, where the packing pressure is always high.

Under my seals the highest pressure attainable is limited only by the strengths of the packing boundaries. That is, the seal will work up to the point of failure of the high pressure cylinder, plunger, cap, bushing or sleeve, whatever fails first.

My seals are usable in a variety of applications, such as, but not limited to liquid pumps, gas compressors and pumps having reciprocating or rotary-shaft seals as well as those having stationary shaft seals. However, I envision that my system will be most useful for high-pressure water intensifiers for use in waterjet cutting. In my system one may use any shaft seal or packing configuration which requires axial loading to be effective. These include, but are not limited to flat washers, tapered washers, or any combination thereof.

The advantage of a stationary seal on a moving plunger is well-known in the industry. Whereas the high pressure cylinder is primarily stressed in tension, the plunger is primarily stressed in compression. This allows the use of extremely wear-resistant materials such as carbides or ceramics for the plunger which, although very strong in compression, may fail under relatively low tensile stress. In a piston pump (seal moving with the piston), as opposed to a plunger pump (plunger moving through stationary seal), selection of materials for the cylinder is limited by the often conflicting requirements for wear resistance, corrosion resistance, ductility and high strength. In my system, less rigid wear resistance, ductility and strength requirements exist which allows greater freedom of choice for cylinder materials.

Although I have disclosed certain present preferred embodiments of my system it should be understood that the invention is not limited thereto, but may be variously embodied within the scope of the following claims.

I claim:

1. An improved cylinder for pumps of the type wherein a plunger moves within a cylinder forcing fluid through a port in a cap fitted into one end of the cylinder comprising:
    (a) a cylinder having a longitudinal bore of a selected first diameter and an enlarged vented channel adjacent the bore and at one end of the cylinder;
    (b) a cap having an inner portion sized and positioned to fit within the bore, a middle portion of larger diameter sized and positioned to fit within the enlarged channel and define a vented cavity between the cap and the cylinder, and an end portion larger than the channel, said cap also having a port therethrough;

(c) a sleeve sized and positioned to fit within the cylinder bore to permit the plunger to move therethrough to always overlap the plunger at one end and to have an opposite end which fits between the cap and an inner wall of the cylinder;

(d) a spacer sized and positioned to fit within the cavity and define a first and second smaller cavity on opposite sides of the spacer, the first smaller cavity being between the spacer and the cap and the second smaller cavity being between the spacer and the cylinder, the spacer also having a vent therethrough which permits fluid to pass between the first smaller cavity and the second smaller cavity and vents the cavities;

(e) a first seal adjacent one end of the spacer, encircling the cap within the cavity;

(f) a second seal adjacent an opposite end of the spacer, encircling the cap, within the bore and adjacent one the end of the sleeve; and (g) a third seal adjacent an opposite end of the sleeve, within the bore and encircling the plunger.

2. The seal of claim 1 wherein at least one of the first seal, second seal and third seal is comprised of a plurality of washers.

3. The seal of claim 2 wherein at least two of the washers are made of different materials.

4. The seal of claim 2 wherein the seals are comprised of a deformable material.

5. The cylinder of claim 4 wherein the deformable material is one of rubber, elastomers, teflon, polymers and reinforced combinations thereof.

6. The seal of claim 1 wherein at least one of the first seal, second seal and third seal is one of flat washers, tapered washers and combinations thereof.

7. An improved cylinder for pumps of the type wherein a plunger moves within a cylinder forcing fluid through a port in a cap fitted into one end of the cylinder comprising:

(a) a cylinder having a longitudinal bore of a selected first diameter and an enlarged vented channel adjacent the bore and at one end of the cylinder;

(b) a cap having a head portion sized and positioned to fit within a sleeve, a shoulder portion sized to fit within the bore, and a body portion of larger diameter sized and positioned to fit within the enlarged channel and together with the shoulder portion define a vented cavity between the cap and the cylinder, and a base portion larger than the channel, said cap also having a port therethrough;

(c) a sleeve sized and positioned to fit within the cylinder bore to permit the plunger to move therethrough to always overlap the plunger at one end and to have an opposite end which fits between the cap and an inner wall of the cylinder;

(d) a first seal encircling the body portion of the cap within the channel;

(e) a second seal adjacent the shoulder portion of the cap, encircling the head portion of the cap, within the bore and adjacent one end of the sleeve; and (f) a third seal adjacent an opposite end of the sleeve, within the bore and encircling the plunger.

8. The seal of claim 7 wherein at least one of the first seal, second seal and third seal are comprised of a plurality of washers.

9. The seal of claim 8 wherein at least two of the washers are made of different materials.

10. The seal of claim 8 wherein the seals are comprised of a deformable material.

11. The cylinder of claim 10 wherein the deformable material is one of rubber, elastomers, teflon, polymers, and reinforced combinations thereof.

12. The seal of claim 10 wherein at least one of the first seal, second seal and third seal is one of flat washers, tapered washers and combinations thereof.

13. An improved cylinder for pumps of the type wherein a plunger moves within a cylinder forcing fluid through a port in a cap fitted into one end of the cylinder comprising:

(a) a cylinder having a longitudinal bore of a selected first diameter and an enlarged vented channel adjacent the bore and at one end of the cylinder;

(b) a cap having a shoulder portion sized and positioned to fit within the bore, a body portion of larger diameter sized and positioned to fit within the enlarged channel and together with the shoulder portion define a vented cavity between the cap and the cylinder, and a base portion larger than the channel, said cap also having a port therethrough;

(c) a sleeve sized and positioned to fit within the cylinder bore to permit the plunger to move therethrough to always overlap the plunger at one end and to have an opposite end which abuts the shoulder portion of the cap;

(d) a first seal encircling the body cap within the channel;

(e) a second seal encircling the shoulder portion of the cap, and within the bore; and (f) a third seal adjacent an opposite end of the sleeve, within the bore and encircling the plunger.

14. The seal of claim 13 wherein at least one of the first seal, second seal and third seal is comprised of a plurality of washers 15. The seal of claim 14 wherein at least two of the washers are made of different materials.

16. The seal of claim 14 wherein the seals are comprised of a deformable material.

17. The cylinder of claim 16 wherein the deformable material is one of rubber, elastomers, teflon, polymers and reinforced combinations thereof.

18. The seal of claim 13 wherein at least one of the first seal, second seal and third seal is one of flat washers, tapered washers and combinations thereof.

* * * * *

UNITED STATES PATENT AND TRADEMARK OFFICE
CERTIFICATE OF CORRECTION

PATENT NO. : 4,960,039
DATED : October 2, 1990
INVENTOR(S) : JASON L. ROBERTSON

It is certified that error appears in the above-identified patent and that said Letters Patent is hereby corrected as shown below:

On the title page,
change the title of the invention to --CYLINDER WITH SLEEVE COMPACTED SEALS FOR A HIGH PRESSURE PUMP--.

Column 1, change the title of the invention to --CYLINDER WITH SLEEVE COMPACTED SEALS FOR A HIGH PRESSURE PUMP--.

Column 2, line 59, after "cavity" delete "and".

Column 4, line 43, change "$d_4$" to --$d_3$--.

Column 4, line 46, change "$P_c$" to --$P_i$--.

Column 7, line 56, claim 7, change "the" to --a--.

Column 8, line 36, claim 13, change "the" to --a--.

Column 7, claim 1, line "the" before plunger was changed to --a--

Signed and Sealed this

Eleventh Day of February, 1992

Attest:

HARRY F. MANBECK, JR.

Attesting Officer

Commissioner of Patents and Trademarks